A. C. EINSTEIN, DEC'D.
B. B. EINSTEIN, ADMINISTRATRIX.
METER.
APPLICATION FILED SEPT. 5, 1914.

1,239,680.

Patented Sept. 11, 1917.

Witnesses:
Geo. R. Ladson
Jessie Clark

Inventor,
Alfred C. Einstein.
By Bakewell & Churd attys.

UNITED STATES PATENT OFFICE.

ALFRED C. EINSTEIN, OF ST. LOUIS, MISSOURI; BLANCHE B. EINSTEIN, ADMINISTRATRIX OF SAID ALFRED C. EINSTEIN, DECEASED, ASSIGNOR TO UNION ELECTRIC LIGHT AND POWER COMPANY, OF ST. LOUIS, MISSOURI.

METER.

1,239,680.  Specification of Letters Patent.  Patented Sept. 11, 1917.

Application filed September 5, 1914. Serial No. 860,317.

*To all whom it may concern:*

Be it known that I, ALFRED C. EINSTEIN, a citizen of the United States, residing at St. Louis, Missouri, have invented a certain new and useful Improvement in Meters, of which the following is a full, clear, and exact description, such as will enable others skilled in the art to which it appertains to make and use the same.

This invention relates to meters, and particularly to meters of the class that are generally used by public service companies for measuring the amount of a commodity, such, for example, as electricity, water, gas, etc., that is supplied to a consumer. The meters of the class referred to that are now in general use are provided with a registering mechanism consisting of an accumulator that controls a series of dials which represent, in standard units of measurement, the total amount of the commodity that passes through the meter. The average consumer is unable to compute from the series of dials the reading of his meter, and is thus in ignorance of the exact amount of the commodity that he is using until a bill is rendered him by the company supplying the same, or if the consumer is able to read the meter, it is necessary for him to make a series of arithmetical calculations to arrive at the desired result. The usual practice has been for an agent of the company supplying the commodity to make periodical visits to the consumer's meter, take the reading from the series of dials and return this reading to the company's office. The company's books show the last previous reading of the meter and this is deducted from the reading that the agent hands in, the result being the amount of the commodity that the consumer has used since the last previous reading. This result, together with the computed cost to the consumer, is entered on a bill which is thereafter sent to the consumer either by mail or by messenger.

One object of my present invention is to provide a meter that comprises means whereby the consumer can tell at a glance, without making any arithmetical calculations, the exact amount of the commodity measured by said meter that has been consumed since the last previous reading of the meter by an agent of the company supplying the commodity.

Another object is to provide a meter of the character described that comprises a visual indicator which shows the exact amount of the commodity consumed during a certain period, said indicator being separate and distinct from the accumulator dials which meters of this general type are usually provided with.

Another object is to provide a meter that is equipped with novel means for enabling an agent of the company to make a permanent record of the amount of the commodity that has been consumed in a given period of time and to render a bill therefor to the consumer at the same time said record is made, thus saving the company the great expense that is now entailed in computing the amount of the consumer's bill at their office and thereafter sending out the bill, either by mail or by messenger.

And still another object is to provide a meter that comprises a total consumption registering mechanism and a period consumption registering mechanism operated by same and consisting of a single member provided with numbers and a hand or pointer that coöperates with said numbers to indicate the amount of the commodity which is consumed during a certain period.

Other objects and desirable features of my invention will be hereinafter pointed out.

Figure 1 of the drawings is a front elevational view of a portion of a meter constructed in accordance with my invention.

Figure 1:
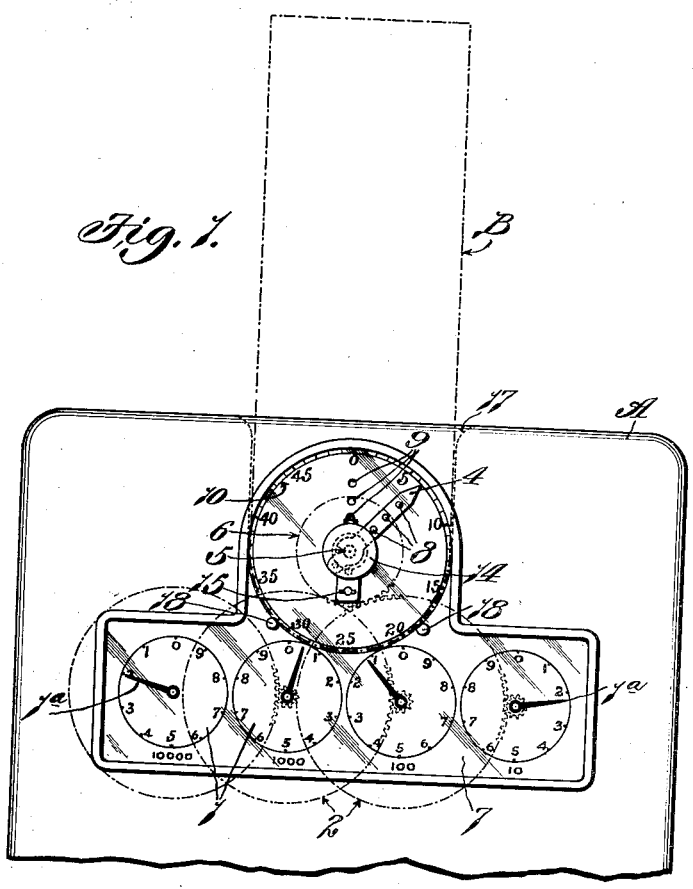

Briefly described, my invention consists in a meter that is provided with a period consumption indicating device that is independent from the usual total consumption indicating device, and which is so designed that any person who can read numbers can tell at a glance the amount of the commodity that has been consumed or which has passed through the meter during a certain period, and means for indicating on a card or record in any suitable manner, such as by perforations, the exact amount of the commodity that has been used by a consumer during a given period.

Referring now to the drawings, which illustrate one form of my invention, A designates the body portion of the meter that is provided with the usual series of dials 1 which indicate the total amount of the commodity that is passing through the meter in units, tens, hundreds, etc. The indicating hands 1ª of the dials 1 are actuated by an accumulating or registering mechanism 2, which may be of any suitable construction or design, said registering mechanism being adapted to be operated by the passage through the meter of the commodity that is being measured thereby in the usual manner. The meter herein shown is of the type that is generally used for measuring electricity, and the marks or figures on the dials 1 represent the standard measurement of electricity, such as kilowatt hours. I wish it to be understood, however, that my invention is not limited to use with this exact type of meter, as it is equally well adapted for use with a gas, water or other meter, when the figures on the dials 1 would then represent cubic feet, gallons, etc., respectively.

In addition to the series of dials 1 the meter is provided with a visual period consumption indicating device which preferably consists of a dial 3 that is arranged adjacent the dials 1 and a coöperating indicating hand 4 that is frictionally held to a shaft 5, said shaft being provided with a gear wheel 6 that meshes with one of the train of gears that form the registering mechanism 2. The dial 3 is graduated and numbered around its margin to indicate the units of measurement of the commodity that is measured by the meter, which units in the case shown are kilowatt hours, and the hand 4 is geared to the registering mechanism 2 in such a ratio that said hand will move about its axis and indicate on the dial 3 the number of kilowatt hours of electricity that are registered by said registering mechanism during a given period of time.

A piece of glass, or other suitable transparent material, 7 preferably covers the dials 1 and 3 so that the indicating hands thereon cannot be tampered with by an unauthorized person, and so that the reading on said dials is visible from the outside of the meter.

The hand 4 of the period consumption indicator is adapted to be re-set or returned to zero at the end of each consumption period, or, in other words, at the time the agent of the company supplying the commodity takes the meter reading, which is usually once a month without disturbing the total consumption registering mechanism. The consumer can, at any time, by referring to the dial 3, tell at a glance the exact amount of the commodity that has been consumed since the indicating hand 4 was re-set, without having to compute the amount registered by the dials 1 and then deduct the last previous reading of said dials in order to obtain the amount of consumption during a given period, as is necessary with the meters of this general type that are now in general use.

Figure 2:
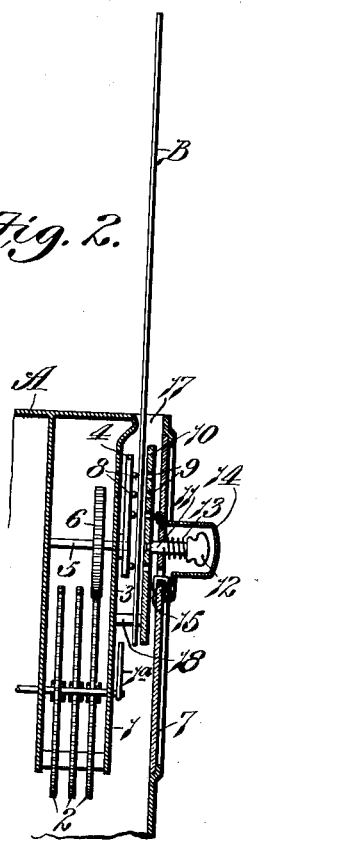
Fig. 2 is a vertical sectional view thereof.

Means are provided for making a permanent record of the reading indicated on the dial 3 by an agent of the company controlling the meter, the means herein shown consisting of a series of pins or punches 8 arranged radially on the hand 4 that coöperate with a series of apertures 9 formed in a yieldingly mounted disk 10, so as to make a line of perforations on a suitable record sheet or card that is interposed between said hand and disk. The disk 10 is formed of transparent material, so as not to obscure the numbers on the dial 3, and said disk is secured to a short shaft 11 that is journaled in the glass cover 7 at a point coinciding with the axis of rotation of the hand 4. The shaft 11 projects through the cover 7 and is provided on its outer end with a knob or head 12, and a coil spring 13 is interposed between said head and said cover, so as to normally keep said disk away from the hand 4, as shown clearly in Fig. 2. Any suitable means may be employed for preventing the hand 4 or the coöperating disk 10 from being tampered with by an unauthorized person, the means herein shown consisting of a hood 14 that covers the knob 12 and which is secured to the transparent cover 7 by a suitable key-controlled latch 15 which can be actuated only by a key carried by an agent of the company.

The card or bill on which the reading of the dial 3 is adapted to be recorded consists of an oblong strip of cardboard or paper B that is approximately the same width as the diameter of the dial 3, and which is rounded at its lower end to provide one-half of a printed dial 16, said dial containing a series of radial graduations and numbers corresponding to the graduations on the single dial 3 to indicate the number of kilowatt hours of electricity consumed, and opposite these graduations on the extreme margin thereof with a series of figures representing the cost of any number of kilowatt hours to the consumer.

Figure 3:
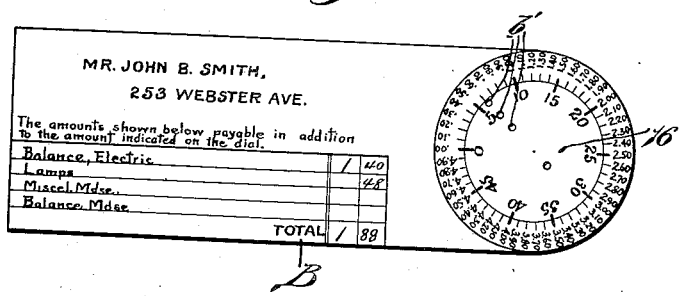
Fig. 3 is a plan view of the record or bill that is made with said meter.

When, at the end of a certain period, an agent of the company controlling the meter calls to take the reading thereof he removes or displaces the hood 14 and rotates the disk 10 until the apertures 9 therein aline with the pins or punches 8 on the hand 4. The card B is then inserted in the meter through a suitable chute or opening 17 with the dial 16 down until it is brought to rest by suitable stops 18 which retain the card in the position shown in dotted lines in Fig. 1, wherein the dial 16 is arranged concentrically with relation to the dial 3. The disk 10 is then forced inwardly in a direction parallel with its axis, by means of the knob 12, so as to force the apertures 9 over the pins 8, and thus form a series of perforations $b'$ on the card B, as shown in Fig. 3, which perforations extend in a radial line corresponding to the position of the hand 4 and indicate on said card the number of kilowatt hours consumed since the last previous reading, together with the company's charge therefor. The card is thereafter withdrawn from the opening 17 and the agent again forces the disk 10 inwardly so as to reëngage the pins 8 on the hand 4, and is thus enabled to rotate said hand rearwardly in order to re-set the same at zero. The knob 12 is then released and the hood 14 locked in the position shown in Fig. 2. The card B with the perforated record thereon is handed to the consumer, who knows immediately his indebtedness to the company for the commodity measured by the meter during a given period, which, in the instance shown in the drawings, amounts to sixty cents, being the price indicated on the margin of the dial 16 for six kilowatt hours of electricity, the recording means on the meter having formed the perforated line $b'$ on the dial 16 that extends to the sixth graduation thereon. The card or record B is preferably provided with a portion containing the consumer's name and address and a blocked off portion in which is noted any other amounts due the company for articles or services, independent of the commodity measured by the meter.

From the foregoing it will be seen that I have provided a meter in which the consumer can tell at any time, without having to make any arithmetical calculations, the exact amount of the commodity measured by the meter that has been consumed in a given period, said meter also comprising means whereby an agent of the company is enabled to render the consumer a correct bill for the amount of the commodity consumed at the same time that he takes the reading of the meter, thus saving considerable time and expense to the company supplying the commodity.

The record B is preferably formed of two duplicate strips that are superimposed and punched simultaneously, one strip being the consumer's bill and the other being retained by the agent as the company's record of the reading of the consumer's meter.

While I have herein shown and described my invention as being applied to an electric meter, it is obvious that it is applicable to any meter that measures a commodity supplied to a consumer, or it could, without departing from the spirit of my invention, be applied to a taxicab meter, in which the fare for the passenger is represented in the same manner as the price of a commodity heretofore described, and in addition, the taxicab meter could be easily modified so as to keep track of the number of bills rendered or fares collected, for each of which a duplicate ticket or record, such as heretofore described, must be turned in by the driver with his receipts.

I am aware of the fact that meters have heretofore been devised which comprised means for enabling an employee of the company supplying the commodity passing through the meter to take a printed or perforated impression of the position of the hands of the various dials of the total consumption registering mechanism, but such meters did not have a period consumption indicator by which a person, unskilled in meter reading, could tell at a glance the amount of the commodity consumed during a certain period, nor did such meters comprise means for producing a simple bill or monthly statement by which a customer could tell, without going to the trouble of an arithmetical calculation, the number of units he had used and the total cost of same. I am also aware of the fact that meters have been devised which comprised a very complicated means for issuing a monthly bill or statement on which is printed or perforated the date of the bill, the cost of the commodity and the amount of the commodity consumed during a certain period, but such meters did not have a visual consumption indicator by which the owner or user could tell at any time the amount of the commodity used since the last bill was rendered, or, in other words, during a certain period. My improved meter is clearly distinguished from meters of the kind just referred to in its simplicity of construction and in the use of a single member and coöperating hand or pointer for visually indicating the amount of the commodity consumed during a certain period and for producing a bill or monthly statement which shows clearly the amount of the owner's indebtedness to the company and the amount of the commodity he has received from the company for said indebtedness.

I claim—

1. In a meter of the class described, a period consumption indicating device comprising a single dial and a coöperating indicating hand provided with a series of projections, a member yieldingly arranged adjacent said dial and having a series of apertures that are adapted to coöperate with said projections, a record sheet provided with a dial that corresponds to said indicating dial and which is adapted to be interposed between said hand and said member, and means for actuating said member toward said hand so as to make an impression on the record dial that corresponds to the reading on the indicating dial.

2. In a meter of the class described, a period consumption indicating device comprising a graduated single dial and a coöperating hand, a yieldingly mounted member arranged adjacent said hand and normally spaced away therefrom and which is adapted to be moved inwardly toward said hand under certain conditions, a record sheet that is adapted to be interposed between said hand and said member, and coöperating means on said hand and said member for forming a record of the position of said hand on said record sheet when said member is moved inwardly.

3. In a meter of the class described, a period consumption indicating device comprising a graduated single dial and a coöperating hand, a yieldingly mounted member arranged adjacent said hand and normally spaced away therefrom and which is adapted to be moved inwardly toward said hand under certain conditions, a record sheet that is adapted to be interposed between said hand and said member, coöperating means on said hand and said member for forming a record of the position of said hand on said record sheet when said member is moved inwardly, and means for preventing an unauthorized person from actuating said member.

4. In a meter for measuring a commodity that is supplied to a consumer by a public service company, a single dial and a coöperating indicating hand for indicating the total amount of consumption of the commodity during a portion of the time the meter has been in use, a record sheet provided with a single dial that is graduated in the same manner as the indicating dial and which is adapted to be placed in the meter between said indicating hand and a movable member in such a manner that the dial thereon coincides with the indicating dial, and coöperating means on said indicating hand and said movable member whereby when said member is moved toward said indicating dial the position of said indicating hand will be recorded on the dial of said record sheet.

5. In a meter of the class described, a period consumption indicating device consisting of a single dial, a record sheet provided with a similar dial that is adapted to be placed over said first mentioned dial, and means for recording on said record sheet dial the amount indicated on said period consumption indicating dial.

6. In a meter of the class described, a period consumption indicating device consisting of a single dial, a record sheet provided with a similar dial that is adapted to be placed over said first mentioned dial, means for recording on said record sheet dial the amount indicated on said period consumption indicating dial, and a series of figures on said record sheet adjacent said amount indicating dial that indicate the company's charge for the amount recorded on said record sheet.

7. In a meter, a period consumption indicating device consisting of a single indicating hand actuated by the total consumption registering mechanism of the meter, and a coöperating stationary graduated dial, and means for rotating said hand rearwardly to re-set the same at zero at the end of a given period.

8. In a meter, a period consumption indicating device consisting of a single indicating hand actuated by the total consumption registering mechanism of the meter and a coöperating stationary graduated dial, means for rotating said hand rearwardly to re-set the same at zero at the end of a given period, and means for preventing an unauthorized person from rotating said hand.

9. In a meter, a period consumption indicating device consisting of a stationary graduated dial and a single coöperating indicating hand actuated by the total consumption registering mechanism of the meter, a transparent cover for said dial, a transparent member journaled in said cover at a point coinciding with the axis of rotation of said hand, said member being slidable in a direction parallel with the axis thereof, and coöperating means on said hand and on said member whereby a record sheet interposed therebetween will be perforated when said member is moved toward said hand.

10. A meter provided with a period consumption indicating mechanism that shows the total amount of the commodity that has been consumed during a certain portion of the time that the meter has been in use, said mechanism comprising a single stationary dial, a movable hand or pointer that coöperates with same, a punching device on said hand, means for supporting a bill or statement provided with a corresponding dial in proximity to said hand, and means for causing the punching device on said hand to make an impression on the dial on said bill.

In testimony whereof I hereunto affix my signature in the presence of two witnesses, this second day of September, 1914.

ALFRED C. EINSTEIN.

Witnesses:
WELLS L. CHURCH,
GEORGE BAKEWELL.